US012152544B2

(12) United States Patent
Henein et al.

(10) Patent No.: US 12,152,544 B2
(45) Date of Patent: Nov. 26, 2024

(54) IN SITU VALUATION OF AUTO-IGNITION QUALITY OF FUEL IN COMPRESSION IGNITION ENGINES

(71) Applicant: Wayne State University, Detroit, MI (US)

(72) Inventors: Naeim A. Henein, Grosse Pointe Farms, MI (US); Prasad D. Raut, Farmington Hills, MI (US); Omkar A. Atre, Farmington Hills, MI (US); Joseph Stempnik, Warren, MI (US)

(73) Assignee: Wayne State University, Detroit, MI (US)

( * ) Notice: Subject to any disclaimer, the term of this patent is extended or adjusted under 35 U.S.C. 154(b) by 75 days.

(21) Appl. No.: 16/861,545

(22) Filed: Apr. 29, 2020

(65) Prior Publication Data

US 2021/0079856 A1 Mar. 18, 2021

Related U.S. Application Data

(60) Provisional application No. 62/839,967, filed on Apr. 29, 2019.

(51) Int. Cl.
*F02D 35/02* (2006.01)
*F02M 57/00* (2006.01)
*F23Q 7/00* (2006.01)

(52) U.S. Cl.
CPC ......... *F02D 35/021* (2013.01); *F02M 57/005* (2013.01); *F02D 2200/0611* (2013.01);
(Continued)

(58) Field of Classification Search
CPC ........... F02D 35/021; F02D 2200/0611; F02D 2200/101; F02D 41/0025; F02P 2017/125;
(Continued)

(56) References Cited

U.S. PATENT DOCUMENTS 6,032,650 A * 3/2000 Rask .................... F02D 41/345 123/435
6,091,244 A * 7/2000 Rottler .................... F02P 17/12 123/406.35
(Continued)

FOREIGN PATENT DOCUMENTS

CA 2444163 A1 * 3/2004 .......... F02B 23/0675
DE 19727004 A1 * 1/1999 ............. F02P 17/12
(Continued)

OTHER PUBLICATIONS

Courses.lumenlearning.com was first indexed by Google in Mar. 2016. https://courses.lumenlearning.com/wsu-sandbox2/chapter/physical-and-chemical-properties-2/ (Year: 2016).*
(Continued)

*Primary Examiner* — Kevin R Steckbauer
(74) *Attorney, Agent, or Firm* — Fishman Stewart PLLC

(57) ABSTRACT

A system for an engine to determine in situ under specified conditions the auto-ignition quality of the fuel used in a compression ignition engine is provided. The system may include an ion current sensor. The ion current sensor may access an engine cylinder for obtaining ion current data. A control unit may be in communication with the ion current sensor for receiving the ion current data. The control unit being configured to determine the auto-ignition quality of the fuel based on features of the ion current data.

20 Claims, 5 Drawing Sheets

(52) U.S. Cl.
CPC ........ *F02D 2200/101* (2013.01); *F23Q 7/001* (2013.01); *F23Q 2007/002* (2013.01)

(58) Field of Classification Search
CPC .. F02M 57/005; F23Q 7/001; F23Q 2007/002
USPC .................................................. 701/101–115
See application file for complete search history.

(56) References Cited

U.S. PATENT DOCUMENTS

| | | | | |
|---|---|---|---|---|
| 6,947,830 | B1 * | 9/2005 | Froloff | F02D 41/3076 701/111 |
| 7,325,529 | B2 * | 2/2008 | Ancimer | F02D 19/061 123/299 |
| 7,401,591 | B2 * | 7/2008 | Yamaguchi | F02D 35/023 123/299 |
| 7,603,226 | B2 * | 10/2009 | Henein | F02D 41/146 701/109 |
| 7,637,246 | B2 * | 12/2009 | Viele | F02D 41/2474 123/406.14 |
| 8,397,550 | B2 * | 3/2013 | Huber | G01N 33/2817 73/114.38 |
| 8,516,991 | B2 * | 8/2013 | Tanno | F02D 35/028 123/304 |
| 9,388,759 | B2 * | 7/2016 | Estefanous | F02D 35/021 |
| 10,774,773 | B2 * | 9/2020 | Henein | F02D 41/1462 |
| 2006/0288979 | A1 * | 12/2006 | Ancimer | F02D 35/026 123/304 |
| 2007/0079817 | A1 * | 4/2007 | VanDyne | F02D 41/38 123/568.21 |
| 2007/0151542 | A1 * | 7/2007 | Yamaguchi | F02D 19/0649 123/436 |
| 2008/0040020 | A1 * | 2/2008 | Henein | F02D 41/2474 123/703 |
| 2008/0053406 | A1 * | 3/2008 | Viele | F02D 35/021 123/406.27 |
| 2011/0088657 | A1 * | 4/2011 | Tanno | F02D 19/061 123/305 |
| 2011/0192216 | A1 * | 8/2011 | Huber | G01N 33/2817 73/35.01 |
| 2011/0224886 | A1 * | 9/2011 | Wang | F02D 19/0636 701/103 |
| 2012/0180756 | A1 * | 7/2012 | Estefanous | F02D 35/028 123/294 |
| 2014/0081556 | A1 * | 3/2014 | Estefanous | F02D 41/1466 701/102 |
| 2014/0379242 | A1 * | 12/2014 | Henein | F02D 35/023 701/104 |
| 2015/0007642 | A1 * | 1/2015 | Angeby | F02P 5/151 73/114.01 |
| 2015/0211435 | A1 * | 7/2015 | Badawy | F02D 41/403 123/480 |
| 2015/0300278 | A1 * | 10/2015 | Badawy | F02D 41/1459 123/406.26 |
| 2021/0079856 | A1 * | 3/2021 | Henein | F02M 57/005 |

FOREIGN PATENT DOCUMENTS

| | | | | |
|---|---|---|---|---|
| DE | 102008001307 A1 * | 10/2009 | | G01N 33/2817 |
| EP | 1793110 A2 * | 6/2007 | | F02D 19/061 |
| WO | WO-2009130777 A1 * | 10/2009 | | F02D 19/061 |
| WO | WO-2012103368 A1 * | 8/2012 | | F02D 19/061 |
| WO | WO-2012118781 A2 * | 9/2012 | | F02D 35/021 |

OTHER PUBLICATIONS

Effect f Cetane Number and Volatility on Autoignition and Combustion of Alternative Fuels and Their Surrogates; Ziliang Zheng, Wayne State University, Jan. 1, 2014. Accessed on the web on Dec. 19, 2022 (Zheng) (Year: 2014).*

N. A. Henein, and Y. Akasaka, “Effect of Physical Properties and Composition on Fuels on Autoignition and Cetane Rating,” SAE International, 871617, 1987 (Heinen NPL). Accessed via STIC reference delivery. (Year: 1987).*

George, Rojan Mathew, “Investigation of Ion Current Signal in a Modern Automotive Diesel Engine” (2014). Wayne State University Theses. 298.; published on the internet and available for public download as of May 13, 2014; URL: https://digitalcommons.wayne.edu/oa_theses/298 (Year: 2014).*

* cited by examiner

IN SITU VALUATION OF AUTO-IGNITION QUALITY OF FUEL IN COMPRESSION IGNITION ENGINES

CROSS-REFERENCE TO RELATED APPLICATIONS

This application claims priority to U.S. Provisional Patent Application No. 62/839,967, filed on Apr. 29, 2019, the contents of which are incorporated herein in its entirety.

TECHNICAL FIELD

The present disclosure is related to a system and method for the engine to in situ determine the auto-ignition quality of a fuel used in a compression ignition engine.

BACKGROUND

Some vehicle applications require the vehicle to operate on a variety of fuels. One such application is for military vehicles where the vehicle may need to operate in a number of different geographical locations where the available local fuels have different auto-ignition qualities.

SUMMARY

A system for determining the auto-ignition quality (e.g. Cetane Number (CN) or Derived Cetane Number (DCN)) of fuel used in a compression ignition engine (e.g. diesel engine) is provided. The system may include an ion current sensor. The ion current sensor may access an engine cylinder for obtaining ion current data. A control unit may be in communication with the ion current sensor for receiving the ion current data. The control unit being configured to determine the auto-ignition quality (e.g. Cetane Number (CN) or Derived Cetane Number (DCN)) of the fuel based on features of the ion current data.

DETAILED DESCRIPTION

Figure 1:
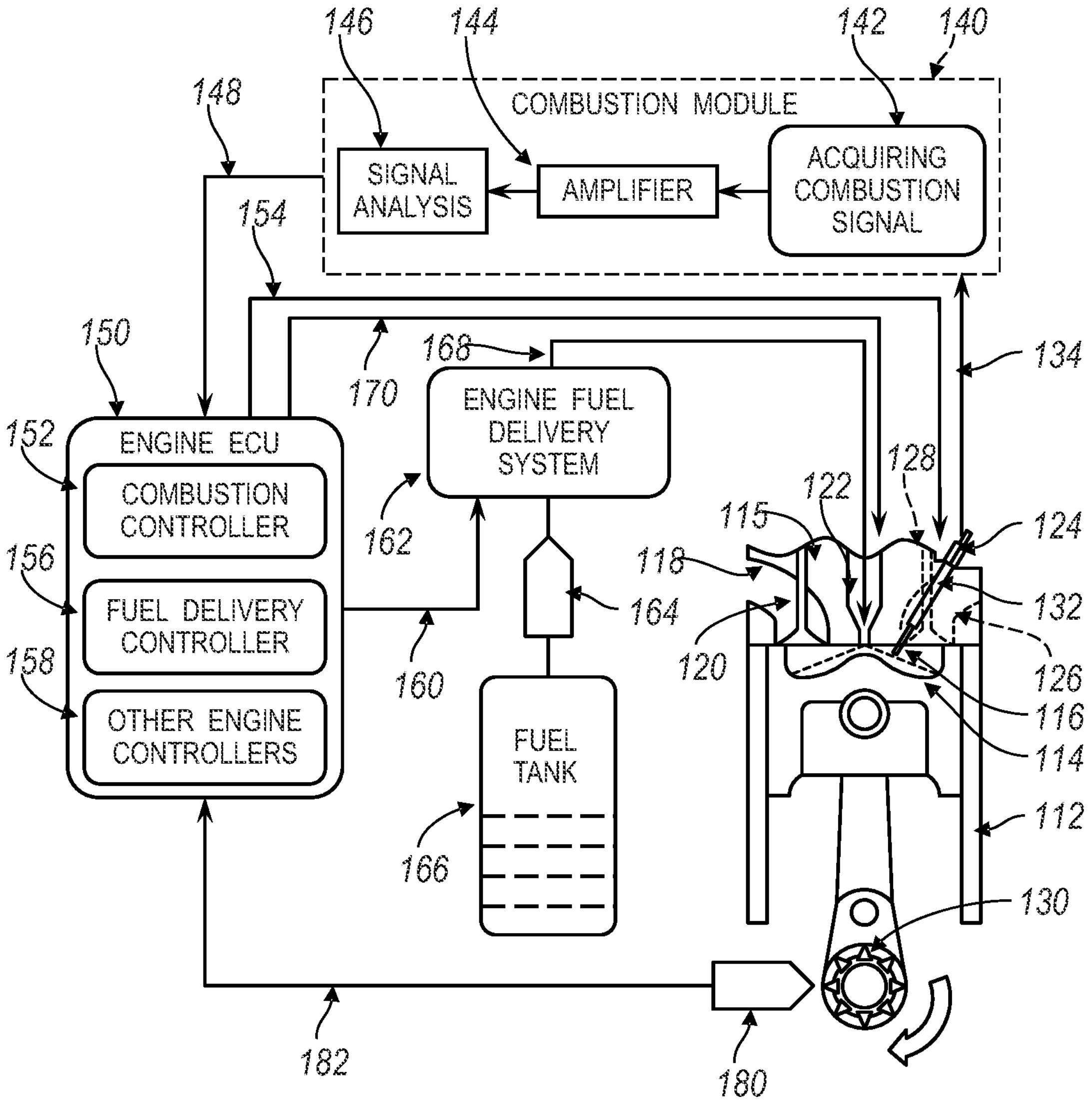
FIG. 1 is a schematic view of a direct injection compression ignition engine having an ECU that is configured to evaluate the auto-ignition quality of fuel used.

The proposed system provides a new technique to in situ evaluate, the auto-ignition quality of the fuel in terms of combustion parameters including but not limited to cetane number, derived cetane number, ignition delay period, rate and magnitude of the pressure rise, etc, by the compression ignition engines. Compression ignition engines include but not limited to conventional and advanced diesel engines, gasoline direct injection compression ignition engines, homogeneous charge compression ignition engines, partial premixed compression ignition engines. The auto-ignition quality of the fuel is one of the most important fuel properties needed for the design of the engine electronic controls, since it has a strong impact on performance, peak power, fuel economy, vibration, noise and engine-out emissions. Compression ignition engine fuels used in domestic and commercial vehicles have variations in the auto-ignition quality that depend on the base stock, refining and mixing with other alternate fuels and renewable fuels. Variations in the fuel's auto-ignition quality are more prominent in military ground vehicles which are required to use aviation JP8 fuel according to the single fuel policy. JP8 has a wide range of auto-ignition qualities. Engine operation on a fuel of different auto-ignition quality than the fuel used in engine calibration may result in undesirable consequences in the field including but not limited to loss in peak engine power, increase in fuel consumption and difficulties in cold start particularly at low ambient temperatures.

The proposed system enables the engine to in situ valuate the auto-ignition quality of the fuel utilizing the combustion ionization technology. Key parameters which are specific to the fuel are derived from the ion current signal and processed to valuate the auto-ignition quality of the fuel.

The proposed technology would enable the compression ignition engine's electronic engineer to design an ECU (Engine Control Unit) that would enable the engine to operate properly and reduce, or eliminate the losses associated with variations in the auto-ignition quality of the fuel. Determining the fuel's auto-ignition quality by this technology can be achieved by operating the engine under specified conditions that can be produced by the engine.

The proposed system meets the need of compression ignition engine's designer and electronic control engineer as it identifies the auto-ignition quality of the fuel by running the engine and applying the procedure developed in this application. Currently, the national as well international drive is to reduce the use of petroleum based fuels and increase the use of biodiesels as extenders. Different extenders and their percentages have different effects on auto-ignition quality of the fuel. The proposed design would enable in situ valuation of the auto-ignition quality of any fuel. For military engines the problem is more severe because of the wide variations in the auto-ignition quality of JP8 aviation fuel as explained earlier in this document.

The need is not met and engines are optimized to operate on a specific fuel which has a certain auto-ignition quality. The auto-ignition quality of the fuel used during engine calibration may differ from the auto-ignition quality of the pump fuel. Considering the large volume of fuel used in compression ignition engines nationwide, such mismatch between the fuel used for calibration and the pump fuel may result in huge losses that can be avoided.

FIG. 1 is a schematic view of a direct injection compression ignition engine having an ECU that is configured to evaluate the auto-ignition quality of the fuel used. For illustrative purposes the schematic shows a single cylinder of an engine, however, it is readily understood that multiple cylinders may be used in combination to form the engine. The cylinder 112 houses piston 114 allowing for reciprocating motion of the piston 114 within the cylinder 112. The combustion chamber 116 is formed by the cylinder houses 112, the piston 114, and the cylinder head 115. Air, a mixture of air and exhaust gases, or other mixtures of any fluid may be provided into the chamber 116 through an intake manifold 118. The flow of air or mixtures made through the intake manifold 118 may be controlled by intake valve 120. Fuel may be provided into the chamber by a fuel injector 122. A glow plug 124 may be used to condition the fuel for combustion inside the combustion chamber 116 causing reciprocating motion of the piston 114. After combustion, the exhaust gases in the chamber may be released through the exhaust manifold 126. Further, the flow of exhaust may be controlled by an exhaust valve 128 located within the exhaust manifold 126. As may be readily understood, combustion in the chamber 116 causes the piston 114 to move downward causing rotation of the crankshaft 130. The inertia of a flywheel or combustion in other chambers will cause the crankshaft 130 to rotate further thereby causing a reciprocating motion of the piston 114 upward. The glow plug 124 can be turned on by the ECU 150 through an electrical command 154. The glow plug 124 may also include a sensor 132 to monitor activity within the combustion chamber 116 during the entire cycle of the engine. The sensor 132 includes an ion current sensor, a pressure sensor, an optical sensor, or any combination of the above. These sensors may be standalone or integrated with the glow plug 124 or the fuel injector 122. The sensor signal 134 may be provided to a combustion module 140. The combustion module 140 includes an acquisition module 142 for acquiring the combustion signal (e.g. the ion current signal) and amplifier 144 for enhancing the combustion signal (e.g. the ion current signal) and a signal analysis module 146 to determine the auto-ignition quality of the fuel based on the enhanced combustion signal (e.g. ion current signal). The auto-ignition quality of the fuel 148 (e.g. Cetane Number (CN) or Derived Cetane Number (DCN)) may then be provided to an engine control module 150. The engine control module 150 may then control engine operation parameters based on the auto-ignition quality of the fuel (e.g. Cetane Number (CN) or Derived Cetane Number (DCN)).

The engine control unit 150 includes a combustion controller 152, a fuel delivery controller 156 and other engine controllers 158. The combustion controller 152 may act as a master module that provides a control signal to different engine components such as the glow plug 124, the fuel delivery system 162, or the injector 122. The fuel delivery controller 156 provides a fuel delivery control signal 160 to an engine fuel delivery system 162. The engine fuel delivery system controls the delivery of fuel to the injector 122. The fuel from the tank 166 is delivered by the fuel pump 164 to the fuel delivery system 162. The fuel delivery system 162 distributes the supplied fuel based on a signal 160 from the ECU 150. The fuel is further supplied to the injector 122 through a fuel line 168. In addition, the fuel delivery controller 156 is in communication electronically with the fuel injector 122 to control different injection parameters such as number of injection events, injection duration and timing as noted by line 170. In addition, the other engine controllers 158 control other engine parameters such as engine speed, load, amount of exhaust gas recirculation, variable geometry turbocharger, or other units installed to the engine. Further, an output sensor 180 may be in communication with the crankshaft 130 to measure crank shaft position, and engine speed, torque of the crankshaft, or vibration of the crank shaft, and provide the feedback signal to the engine control unit 150 as denoted by line 182.

Figure 2:
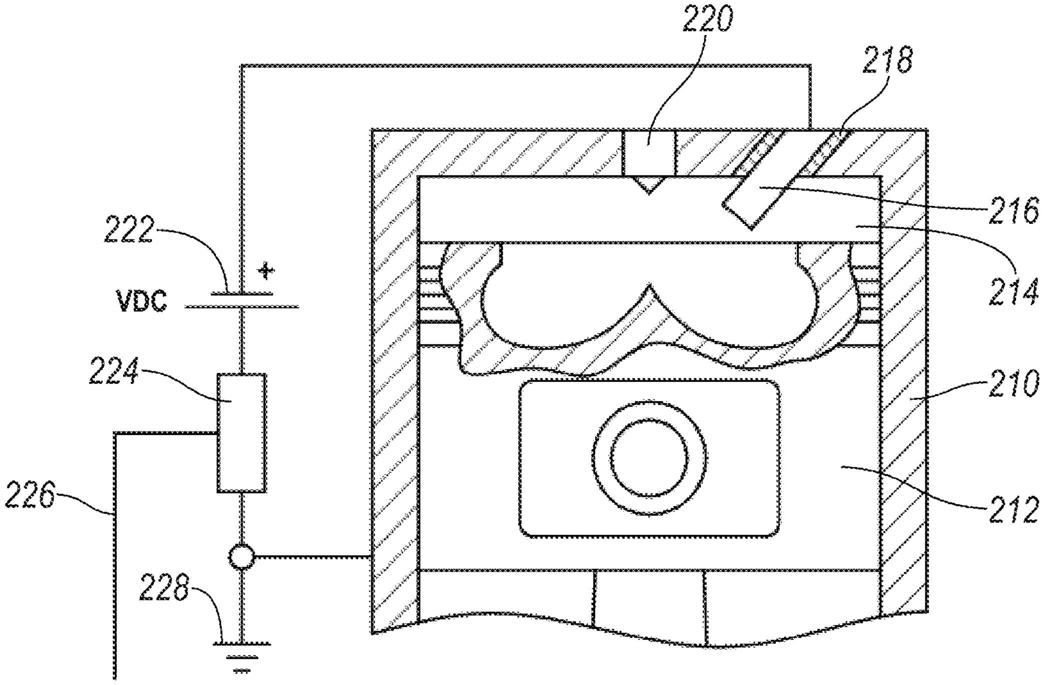
FIG. 2 is a schematic view of an engine cylinder illustrating an insulated engine part that is used to measure ion current signal.

FIG. 2 is a schematic view of an engine cylinder illustrating an insulated engine part that is used to measure ion current signal. The engine block 210 includes a combustion chamber 214 and a piston 212. In this schematic the isolated in-cylinder engine part is a glow plug 216. The glow plug 216 is electrically insulated from the engine block 210 by an isolation material 218. The isolation material may be any dielectric material including for example high temperature resistance plastic, nylon, ceramic, nano-material or other nonconductive materials. While it is understood that the glow plug 216 may be used as the insulated in-cylinder part to provide the supply voltage, other parts may be isolated instead of or in addition to the glow plug 216 and provided the supply voltage. For example, the fuel injector 220 may be used as the insulated in-cylinder part to provide the supply voltage instead of or along with the glow plug 216. Similarly, other in-cylinder engine parts may be used along with or instead of the glow plug 216. For example, a spark plug, a valve, engine cylinder head, or even the special purpose probes.

The in-cylinder part may be connected to the positive terminal of a high voltage power supply 222.

The combustion chamber 214 of the engine block 210 may be connected to the negative terminal of the voltage supply 222. For example, the engine block 210 may be connected to the negative terminal of the power supply 222 through a load 224. The load 224 may be a voltage or current measurement device which then provides a measurement output 226 to a control unit. In addition, the engine block 210 may be connected to an electrical ground as noted by reference numeral 228. The isolated in-cylinder part may be a glow plug, a fuel injector, valves, cylinder head, cylinder head gaskets, a spark plug, any ion sensor, a special purpose probe, a newly added part to the combustion chamber or any combination from the list above.

Figure 3:
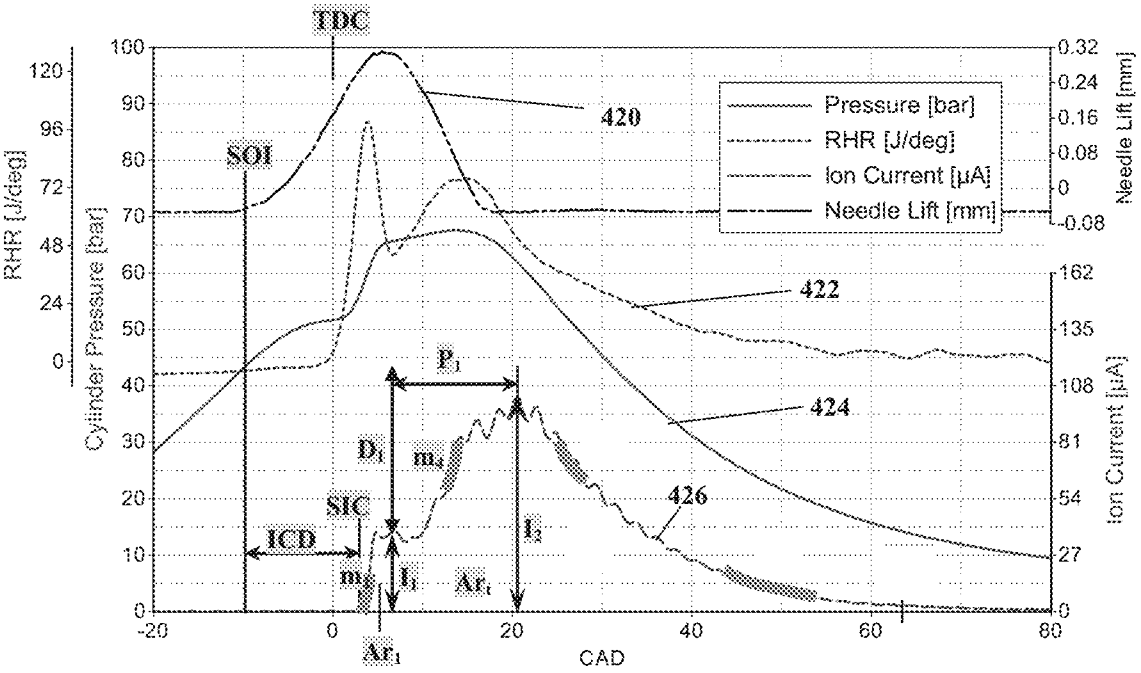
FIG. 3 illustrates an analysis of the ion current signal.

Now referring to FIG. 3, a graph of the pressure trace 424, rate of heat release 422, needle lift signal 420, and ion current signal 426 is provided. Ion current signal parameters are shown in the graph to illustrate an algorithm to determine auto-ignition quality of the fuel (e.g. Cetane Number (CN) or Derived Cetane Number (DCN)) being used based on the ion current signal. As examples of the parameters deduced from the ion current signal, the start of ion current signal (SIC) timing, which may be accomplished by various thresholding techniques, the ion current slope ($m_1$, $m_2$, $m_3$, $m_4$), where $m_1$ refers to the rate of ion current rise, $m_2$ is the rate of ion current decay, $m_3$ is the rate of the second peak decay, and $m_4$ is the rate of the ion current second peak rise. More slopes may be added depending on the number of peaks of each cycle-to-cycle ion current signal. The slope may be determined as the slope at which the ion current signal crosses an ion current threshold or may be the slope of the ion current signal at a specific position in degrees of the cycle. In some implementations, the slope may be determined at an offset position relative to an event such as the beginning of the ion current signal, the beginning of an ignition event, or some other characteristic marker of the cycle of the cylinder in which the ion current is measured. Further, the slope may be an instantaneous slope or may be an average slope, for example over a few degrees. The ion current delay (ICD) is another ion current parameter which is determined by a reference point which can be but not limited to the SOI (Start of Injection) (for example, as sensed by ECU) or the TDC (Top Dead Center) (for example, as sensed by the cam shaft sensor). Another parameter is the ion current amplitude ($I_1$, $I_2$, $I_3$, . . . , $I_n$ in case of different peaks) for example, the first peak $I_1$ and second peak $I_2$. The difference between two consecutive amplitudes ($D_1$, . . . , $D_n$ in case of different peaks). The ion current peak to peak distance ($P_1$, . . . , $P_n$ in case of many peaks). The end of ion current signal timing (EIC), which may be accomplished by various thresholding techniques, and the total area under the curve (Ar) of the ion current signal, the area under the first bump ($Ar_1$), and the area under the second bump ($Ar_2$), and ($Ar_n$) for the area under the bump (n). Other parameters may be derived and will become readily apparent to persons skilled in the art In one example, the relationship used to come up with measured parameters may be expressed as predicted parameter=A*Fn (SOI)+B*Fn (m)+C*Fn (I)+L*Fn (P)+E*Fn (ICD)+F*Fn (Ar)+H*Fn (EOI)+K*Fn(D)+Y*Fn (SOI,m)+X*Fn (SOI, m, I)+ . . . etc. While the forgoing equation is exemplary, additional variables may be readily introduced. Such variables may include peak to peak, peak to end, peak to start, peak to start of injection, peak to top dead center, peak to end of injection, peak to start of combustion, peak amplitudes for each peak, or any of the other parameters mentioned herein and each of those variable may have their own weighting as indicated above. In addition, weighting factors such as A, B, C, L, E, F, H, K, Y, . . . , X may constants or may vary according to a look up table based on other parameters such as ion current sensor location inside the combustion chamber or the combustion chamber geometry. Further, it is anticipated that other relationship functions may be developed including linear, quadratic, root, trigonometric, exponential or logarithmic components or any combination thereof. In one particular example in accordance with the general equation provided above, auto-ignition quality of the fuel could be predicted according to a function:

$$\text{Auto-ignition quality parameter such as Cetane number } (CN)=A0+A1(\text{Par1})+A2(\text{Par2})+A3(\text{Par3})+A4(\text{Par4})+A5(\text{Par1*Par2})+A6(\text{Par1*Par3})+A7(\text{Par1*Par4})+A8(\text{Par2*Par3})+A9(\text{Par2*Par4})+A10(\text{Par1*Par2*Par3})+A11(\text{Par1*Par3*Par4})+A12(\text{Par1\^{}2*Par2\^{}2*Par3\^{}2*Par4\^{}2})$$

where (Par) stands for an ion current parameter and (A) is a coefficient or weighting.

In another example, the auto-ignition quality of the fuel may be calculated based on a function related to the ion current delay and the start of ion current. For example, A*Fn (ICD)+B*Fn (I1)+C*Fn (i1), where i1 is the location of the of the first peak and I1 is the amplitude of the first peak.

Figure 4:
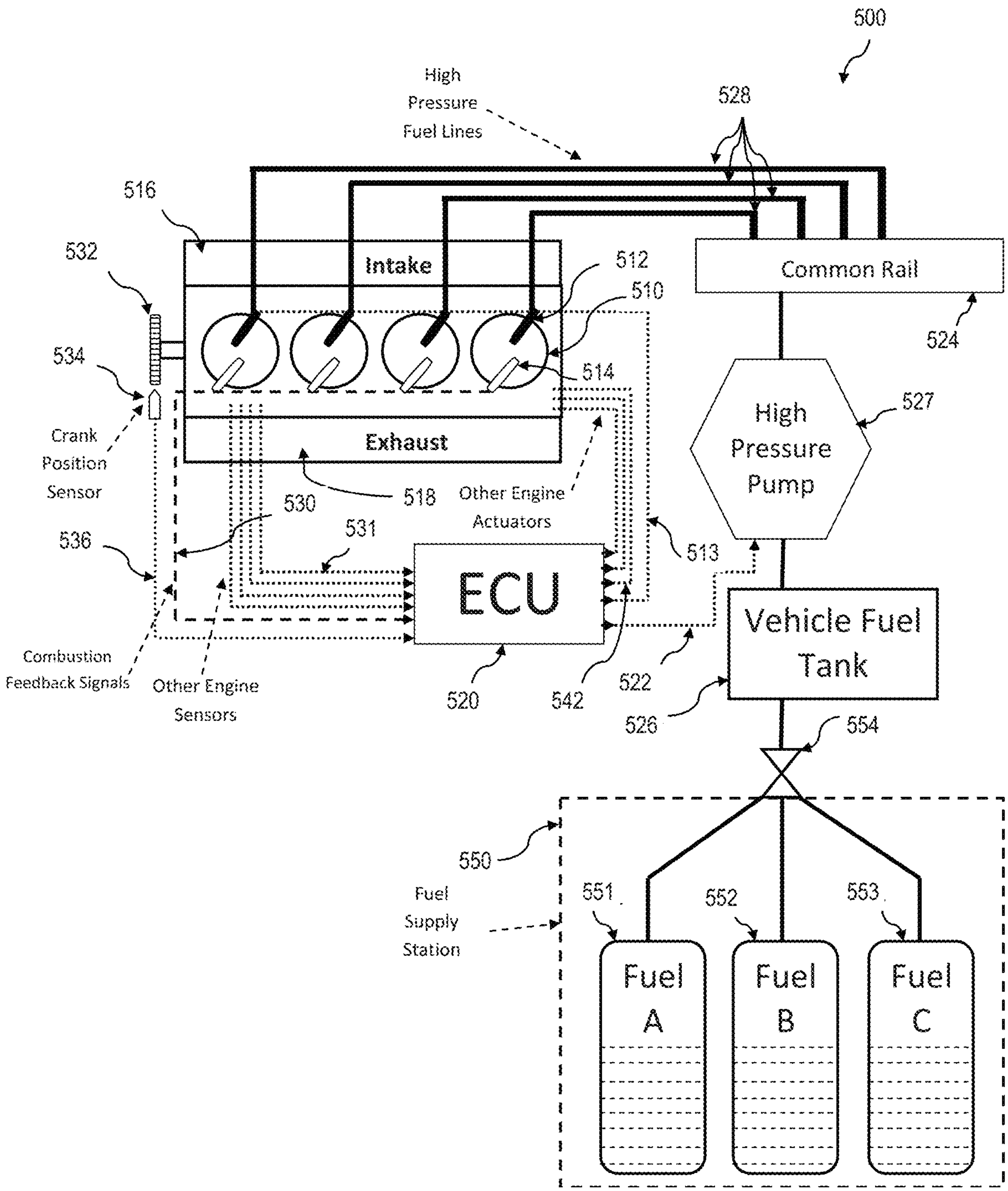
FIG. 4 is a schematic view of a multi cylinder engine having ECU that evaluates the auto-ignition quality of multiple fuels.

Now referring to FIG. 4, a schematic view of a multi-cylinder compression ignition engine is provided that is able to determine the auto-ignition quality (e.g. Cetane Number (CN) or Derived Cetane Number (DCN)) of various types of fuels. The engine 500 includes a plurality of cylinders 510. Each cylinder having a fuel injector 512 and a combustion feedback sensor 514. In case of spark ignition engines, a spark plug may be included inside each cylinder for combustion timing control. The air is provided to the cylinder through an intake manifold 516 and exhaust is removed from the cylinder from an exhaust manifold 518. An engine control unit 520 is provided to receive feedback from the engine and control the engine parameters as described with regard to the previous implementations. The electronic control unit 520 provides a fuel pressure actuation signal 522 to a fuel delivery system 527. The fuel delivery system 527 includes a high pressure pump 527 to draw fuel from a fuel tank 526. The fuel pressure actuation signal 522 may control the fuel pressure that is provided by the fuel delivery system to the common rail 524, which distribute the fuel to the high pressure fuel lines 528. The high pressure fuel lines 528 provide fuel to the fuel injectors 512 of each of the cylinders 510. The fuel injector 512 may also receive a signal from the electronic control unit 520 to control the number of injection events, timing and duration of the fuel into the combustion chamber through electronic signals 513. The combustion feedback sensor 514 may provide a combustion feedback signal 530 to the electronic control unit 520. The reciprocating motion of the pistons in cylinders 510 serves to turn the crankshaft 532. A crank position sensor 534 is configured to determine the crank position angle and provide a crank position signal 536 to the electronic control unit 520. The fuel tank 526 may be filled with a fuel through a supply valve 554. The enclosure 550 represents fuel suppliers or gas stations that supply various fuels. An example of three different fuels is represented by three fuel tanks A, B, and C denoted as 551, 552, and 553 respectively. Each of these tanks may have different fuels that have wide ranges of physical and chemical properties, and are produced from different basic stocks. These tanks may also have the same type of fuel but with some variability in their chemical or physical properties.

For compression ignition engines, the fuel used can be the conventional ULSD or gasoline fuel available on the market, an alternate petroleum derived fuel having different properties than the conventional ULSD fuel, a bio-fuel or a blend of the these fuels. Such properties include but not limited to volatility, Cetane Number (CN), density, and heating value. Alternate fuels include aviation fuels such as (JP-8) or synthetic fuels such as (S-8). Renewable fuels include but not limited to Biodiesel fuels, alcohols, and their blends with other petroleum derived fuels. For spark ignition engines, the fuel can be liquid, gasoline of different octane numbers, a biofuel such as ethanol, a blend of gasoline and a bio-fuel, gas or liquefied gas depending on the type of engine and its application. Further, the engine 500 may be supplied by blends of any fuel developed by a fuel supplier or blends due to filling the vehicle fuel tank 526 from different suppliers/stocks or sources.

According to the “Single Battlefield Fuel” policy, JP8 is used by all U.S. Army fuel consuming machinery in addition to its use as the main fuel for aviation. The expected increase in the demand on JP-8 by aviation industry might require the use of JP-8 blends in ground vehicles. JP-8 can be blended with lower auto-ignition quality fuels, such as Sasol IPK. These blends have a wide range of physical and chemical properties, most important of which is the auto-ignition quality. The use of low auto-ignition quality blend s may cause a loss in power and fuel economy, which requires new electronic control strategies to regain such losses. Different blends will require different control strategies that depend mainly on the auto-ignition quality of the fuel/blend. An intelligent engine can be designed to determine the auto-ignition quality of the fuel/blend in the vehicle-tank and apply the control strategies needed to optimize engine performance and achieve gains in power and fuel economy.

The design allows the compression ignition engine to autonomously determine the auto-ignition quality of the fuel/blend in the tank by using the combustion ionization technology. A method may be developed to determine the auto-ignition quality of the fuel/blend in the tank and identify the IAQ (e.g. Ion Current based auto-ignition quality). The method may include demonstrating the use of the IAQ scale to determine the auto-ignition qualities of different fuels and blends in the tank.

The method discussed may be experimentally guided by detailed analysis and 3D computer simulations of ion current in compression ignition engines while operating on fuels of different auto-ignition qualities. A CAT C7 motor may be used in this investigation. One cylinder in the engine may be instrumented and fitted with an ion-glow plug and a pressure transducer. If the HEUI injector can be electrically insulated from the cylinder head, it may be used as a MSFI (Multi Sensing Fuel Injector), in addition to the glow plug to measure the ion current. One additional advantage of the use of the injector as MSFI may be that it can sense the injection command, which can be used for control, diagnosis and troubleshooting of the injection process.

Baseline tests may be conducted using ULSD and JP8 of known auto-ignition qualities to measure ion current produced by the glow-ion plug and the HEUI injector, in addition to other performance parameters. These tests may be followed by tests using fuels of different auto-ignition qualities and fuels treated with an auto-ignition quality improver additive. For example, as shown in FIG. 4.

The use of the ion current signal to determine the auto-ignition quality of the fuel may utilize a detailed analysis of the ion current trace to understand relationship between its parameters and the auto-ignition and combustion events. In automotive compression ignition engines, the fuel is delivered in the form of liquid sprays injected in swirling air. The processes of atomization, evaporation, mixing, auto-ignition and start of combustion occur simultaneously but separately in many sprays. As the combustion products pass by the ion current probe, it attracts the ionized species in the sprays. The amplitude of the ion current signal produced for each spray depends on the concentration of the ionized species at the time the spray arrives at the probe.

FIG. 3 illustrates traces for the ion current, cylinder gas pressure, RHR and needle lift in the operation of a turbo-charged compression ignition engine. The ion current was measured by the production glow plug after its modification to act as an ion current sensor as in a glow plug. The main features of the ion current signal are identified in the figure with their amplitudes and phasing relative to the start of injection and/or to the RHR parameters. Most of these features depend on the properties of the fuel. A detailed analysis of the ion current trace showed that some of these features and their combinations are indicators of the auto-ignition quality of the fuel.

It should be noted that the features of the ion current trace depend on the location of the probe in the combustion chamber as well as on the design parameters of the combustion chamber and fuel injection system. However, the ion current signals of engines of the same family of similar designs should have similar features in the ion current trace The proposed test for a CAT C7 engine and the techniques developed to determine the auto-ignition quality from the ion current signal may be expected to apply in all CAT C7 engines.

A 3D computational fluid dynamics (CFD) cycle simulation may be used to investigate the characteristics of the ion current produced in a CAT C7 military engine. The simulation may be developed for two fuels JP-8 have a first auto-ignition quality and Sasol IPK having a different second auto-ignition quality.

The model may predict the mole fraction of the ionized species produced during combustion. The simulation can show the effect of the geometry and location of the ion current probe on the ion current signal. The ion current may be measured by a glow plug modified to act as an ion current sensor, while it acts as a heating device. The simulation may be for an engine operation at a specified speed and specified load and specified operating conditions. The procedure may require the engine operation under these specified conditions and simulation may be limited to these conditions. The simulation may identify the important ion current parameters mentioned earlier and their relationship to the combustion process. Finally a scale will be developed for auto-ignition quality versus the ion current specified parameter. The IAQ of any fuel/blend that is bracketed by the JP8 and Sasol IPK will be determined from the scale.

A scale may be developed using the production engine to determine the auto-ignition quality of the fuel in the tank. The scale may be determined using multiple fuels having a wide range auto-ignition qualities as determined by the CFR (Cooperative Fuel Research) engine or using the IQT (Ignition Quality Tester). IAQ may then be determined using the same fuels using the production engine and is specific to each engine family. Then a function may be developed between the Ion current based auto-ignition quality and the auto-ignition quality.

Figure 5:
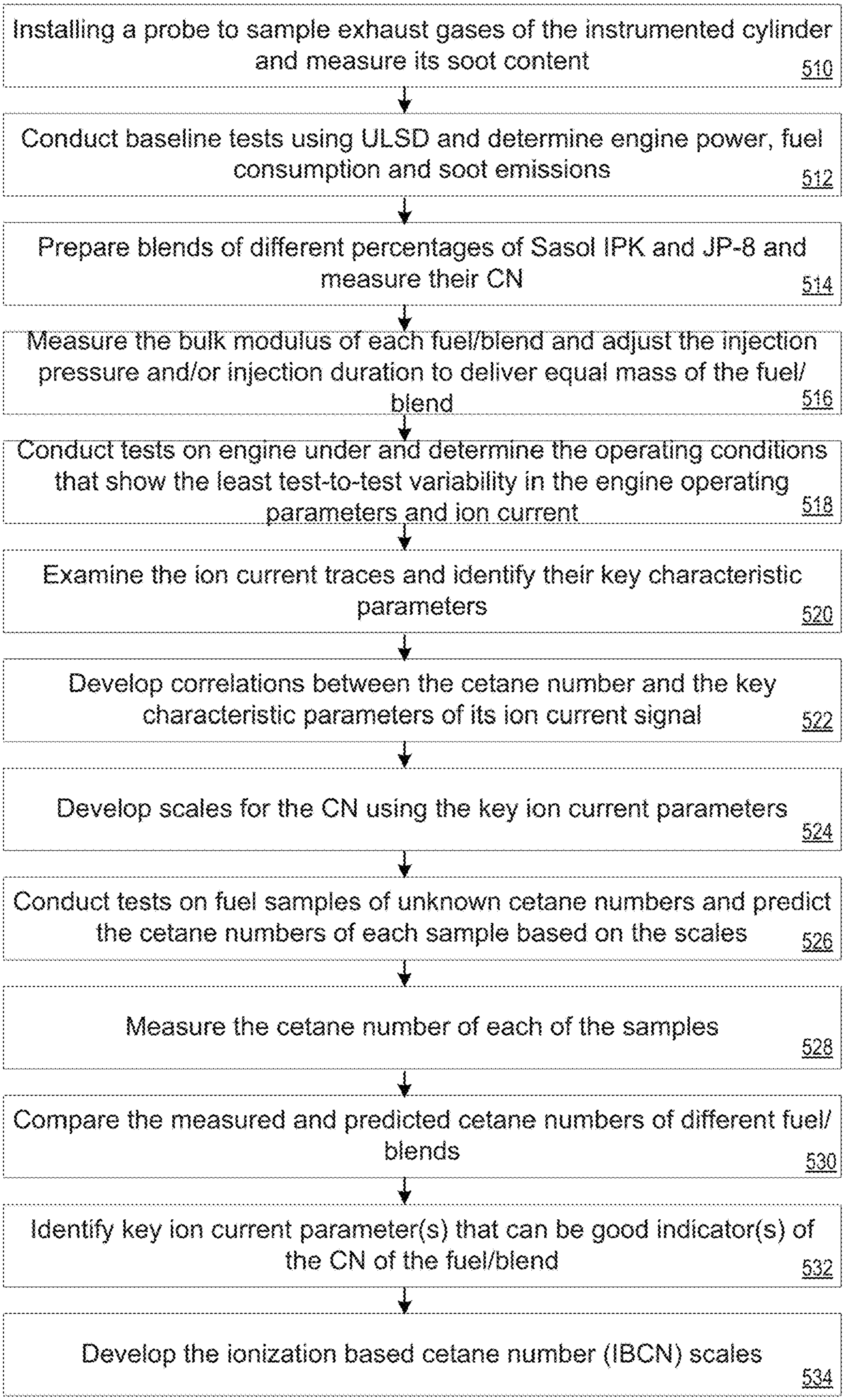
FIG. 5 illustrates a method for implementing a system to determine the auto-ignition quality (e.g. Cetane Number (CN) or Derived Cetane Number (DCN)) of a fuel used in a compression ignition engine.

FIG. 5 illustrates a method for implementing a system to determine the auto-ignition quality (e.g. Cetane Number (CN) or Derived Cetane Number (DCN)) of a fuel used in a compression ignition engine. The method used to implement the design and develop the scale may include:

1. Installing a probe to sample exhaust gases of the instrumented cylinder and measure its soot content. (510)
2. Conduct baseline tests using ULSD and determine engine power, fuel consumption and soot emissions. (512)
3. Prepare blends of different percentages of Sasol IPK and JP-8m and measure their auto-ignition quality by using the IQT (Ignition Quality Tester). (514)
4. Measure the bulk modulus of each fuel/blend and adjust the injection pressure and/or injection duration to deliver equal mass of the fuel/blend. (516)
5. Conduct tests on CAT C7 engine under steady state engine speed, load, fuel injection pressure, start of injection and cooling water temperature and determine the operating conditions that show the least test-to-test variability in the engine operating parameters and ion current. (518)
6. Examine the ion current traces and identify their key characteristic parameters. (520)
7. Develop correlations between the auto-ignition quality of the fuel and the key characteristic parameters of its ion current signal. (522)
8. Develop scales for the auto-ignition quality using the key ion current parameters. (524)
9. Conduct tests on samples of fuels/blends of unknown auto-ignition quality of the fuel in CAT C7 under the specified conditions of item (5) and predict the auto-ignition quality of the fuel of each sample based on the scales developed in item (8). (526)
10. Measure the auto-ignition quality of the fuel of each of the samples of item (9) using the IQT. (528)
11. Compare the measured and predicted auto-ignition quality of the fuel of different fuel/blends. (530)
12. Identify key ion current parameter(s) that can be good indicator(s) of the auto-ignition quality of the fuel/blend. (532)
13. Develop the ionization based auto-ignition quality of the fuel (IBAQ) scales. (534)

The developed scales may be stored in a memory accessible to a processor (such as the ECU) that analyzes the ion current signal to determine the auto-ignition quality of the fuel being used.

The methods, devices, processors, modules, engines, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

As a person skilled in the art will readily appreciate, the above description is meant as an illustration of implementation of the principles of this-disclosure. This description is not intended to limit the scope or application of this system in that the system is susceptible to modification, variation and change, without departing from the spirit of this disclosure, as defined in the following claims.

The invention claimed is:

1. A system for an engine to determine in situ under specified conditions an auto-ignition quality of fuel used in a compression ignition engine, the system comprising:
- an ion current sensor accessing an engine cylinder for obtaining ion current data from an ion current signal;
- a control unit in communication with the ion current sensor for receiving the ion current data, the control unit being configured to determine the auto-ignition quality of the fuel based on features of the ion current data, wherein the auto-ignition quality includes a cetane number or a derived cetane number of the fuel; and
- wherein the control unit determines the auto-ignition quality of the fuel based on a slope of the ion current data including a rate of second peak rise and a rate of second peak decay.

2. The system of claim 1, wherein the specified conditions include steady state operation at a certain engine speed and load.

3. The system of claim 1, wherein the control unit determines the auto-ignition quality of the fuel based on an ion current delay of the ion current data.

4. The system of claim 1, wherein the control unit determines the auto-ignition quality of the fuel based on a location of a second peak of the ion current data.

5. The system of claim 1, wherein the control unit determines the auto-ignition quality of the fuel based on a location of a peak of a derivative of the ion current signal leading to at least one of a first peak and a second peak of the ion current data.

6. The system of claim 1, wherein the control unit determines the auto-ignition quality of the fuel based on a distance between a first peak and a second peak of the ion current data.

7. The system of claim 1, wherein the control unit determines the auto-ignition quality of the fuel based on location of a start of the ion current data.

8. The system of claim 1, wherein the control unit determines the auto-ignition quality of the fuel based on a location of a first peak of the ion current data.

9. The system of claim 1, wherein the slope of the ion current data further includes a rate of ion current rise and a rate of ion current delay.

10. The system of claim 1, wherein the control unit determines the auto-ignition quality of the fuel based on an area under a curve of the ion current data.

11. The system of claim 1, wherein the control unit determines the auto-ignition quality of the fuel based on an amplitude of one or more peaks of the ion current data.

12. The system of claim 1, wherein the control unit determines the auto-ignition quality of the fuel based on a sum of multiple functions of one or more of a start of the ion current signal and/or the slope of the ion current signal and/or an area under a curve of the ion current signal and/or an ion current amplitude and/or an ion current delay.

13. The system of claim 1, further comprising a glow plug including the ion current sensor, wherein the glow plug is electrically insulated from an engine block by a dielectric isolation material and provides a measurement output to the control unit.

14. The system of claim 12, wherein each function is weighted prior to summing.

15. A system for determining in situ under specified conditions an auto-ignition quality of a fuel used in a compression ignition engine, the system comprising:
- an ion current sensor accessing an engine cylinder for obtaining ion current data of an ion current signal;
- a control unit in communication with the ion current sensor for receiving the ion current data, the control unit being configured to determine the auto-ignition quality of the fuel based on a slope of the ion current signal and one or more of a start of the ion current signal and/or an area under a curve of the ion current signal and/or ion current amplitude and/or ion current delay and/or a function of any combination of the above or related parameters, wherein the slope of the ion current signal includes a rate of second peak rise and a rate of second peak decay; and
- wherein the auto-ignition quality includes a cetane number or a derived cetane number of the fuel.

16. The system of claim 15, wherein the control unit is configured to determine the auto-ignition quality of the fuel based on a sum of multiple functions of one or a combination of multiple ion current signal features.

17. The system of claim 15, wherein the ion current sensor is integrated into an isolated in-cylinder engine part including a glow plug, an engine gasket, a fuel injector, or any electrically insulated probe, and wherein the isolated in-cylinder engine part is electrically insulated from an engine block by a dielectric isolation material.

18. A system for determining in situ under specified conditions an auto-ignition quality of fuel used in a compression ignition engine, the system comprising:

an ion current sensor integrated into a glow plug of an engine cylinder for obtaining ion current data of an ion current signal, the glow plug being electrically insulated from the engine cylinder by a dielectric isolation material; and a control unit in communication with the ion current sensor for receiving the ion current data, the control unit being configured to determine the auto-ignition quality of the fuel based on at least one ion current parameter from a list of ion current parameters consisting of: a start of the ion current signal, a slope of the ion current signal, an area under a curve of the ion current signal, an ion current amplitude, an ion current delay, wherein the slope of the ion current signal includes a rate of second peak rise and a rate of second peak decay; and wherein the auto-ignition quality includes a cetane number or a derived cetane number of the fuel.

19. The system of claim 18, wherein the control unit is configured to determine the auto-ignition quality of the fuel based on a sum of multiple functions or a combination of multiple ion current signal features.

20. The system of claim 18, wherein the control unit is configured to determine the auto-ignition quality of the fuel based on a sum of multiple functions or a combination of multiple ion current signal parameters, wherein each function is weighted prior to summing.

* * * * *